(12) United States Patent
Fedesna et al.

(10) Patent No.: US 9,330,529 B2
(45) Date of Patent: May 3, 2016

(54) GAME TERMINAL CONFIGURED FOR INTERACTION WITH JUKEBOX DEVICE SYSTEMS INCLUDING SAME, AND/OR ASSOCIATED METHODS

(75) Inventors: Kenneth J. Fedesna, Hawthorn Woods, IL (US); Mark D. Loffredo, Green Oaks, IL (US); Edward J. Suchocki, Buffalo Grove, IL (US); Edward E. Pellegrini, Palatine, IL (US); Frank J. Pellegrini, Elburn, IL (US)

(73) Assignee: TouchTunes Music Corporation, New York, NY (US)

( * ) Notice: Subject to any disclaimer, the term of this patent is extended or adjusted under 35 U.S.C. 154(b) by 312 days.

(21) Appl. No.: 11/624,008

(22) Filed: Jan. 17, 2007

(65) Prior Publication Data

US 2008/0171594 A1  Jul. 17, 2008

(51) Int. Cl.
*G06F 19/00* (2011.01)
*G07F 17/32* (2006.01)
*A63F 13/90* (2014.01)

(52) U.S. Cl.
CPC .......... *G07F 17/3218* (2013.01); *A63F 13/08* (2013.01)

(58) Field of Classification Search
CPC ................................ A63F 130/00; A63F 9/24
USPC .......... 463/21, 18–20, 1–6, 40–47; 340/5.73, 340/5.81; 540/5.81
See application file for complete search history.

(56) References Cited

U.S. PATENT DOCUMENTS

| | | | |
|---|---|---|---|
| 3,807,541 A | 4/1974 | Kortenhaus | |
| 3,982,620 A | 9/1976 | Kortenhaus | |
| 4,008,369 A | 2/1977 | Theurer et al. | |
| 4,186,438 A | 1/1980 | Benson | |
| 4,232,295 A | 11/1980 | McConnell | |
| 4,335,809 A | 6/1982 | Wain | |
| 4,335,908 A | 6/1982 | Burge | |
| 4,356,509 A | 10/1982 | Skerlos et al. | |
| 4,369,442 A | 1/1983 | Werth et al. | |
| 4,375,287 A | 3/1983 | Smith | |
| 4,412,292 A | 10/1983 | Sedam | |
| 4,413,260 A | 11/1983 | Siegel et al. | |
| 4,521,014 A | 6/1985 | Sitrick | |

(Continued)

FOREIGN PATENT DOCUMENTS

| | | |
|---|---|---|
| AU | 199954012 | 4/2000 |
| CN | 1558690 | 12/2004 |

(Continued)

OTHER PUBLICATIONS

Definititon of "Stand", Merriam-Webster's Ninth New Collegiate Dictionary, p. 1148, 1986.*

(Continued)

*Primary Examiner* — Ronald Laneau
*Assistant Examiner* — Ross Williams
(74) *Attorney, Agent, or Firm* — Nixon & Vanderhye, P.C.

(57) ABSTRACT

Portable coin-operated video game systems and methods are provided. Portable interactive entertainment devices are removably secured to stands. The portable interactive entertainment devices may be unsecured in response to a user providing currency or a credit card or in response to a remote control signal. The portable interactive entertainment devices may include touch screens and allow users to play video games and access data and devices connected to a local area network and a wide area network.

31 Claims, 9 Drawing Sheets

(56) References Cited

U.S. PATENT DOCUMENTS

| | | |
|---|---|---|
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |

(56) References Cited

U.S. PATENT DOCUMENTS

| | | |
|---|---|---|
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,751,336 A | 5/1998 | Aggarwal et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choquier |
| 5,774,672 A | 6/1998 | Funahashi |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,193 A | 3/1999 | Takahashi |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Bleidt et al. |
| 5,923,885 A | 7/1999 | Johnson |
| 5,926,531 A | 7/1999 | Petite |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,963,916 A | 10/1999 | Kaplan |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |

(56) References Cited

U.S. PATENT DOCUMENTS

| | | |
|---|---|---|
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 * | 9/2003 | Paulsen ............ 455/414.1 |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,160,132 B2 | 1/2007 | Phillips et al. |
| 7,188,352 B2 | 3/2007 | Nathan et al. |
| 7,195,157 B2 * | 3/2007 | Swartz et al. ............ 235/383 |
| 7,198,571 B2 * | 4/2007 | LeMay et al. ............ 463/25 |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |

(56) References Cited

U.S. PATENT DOCUMENTS

| | | |
|---|---|---|
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1* | 6/2003 | Itkis et al. ............... 463/39 |
| 2003/0108164 A1 | 6/2003 | Laurin et al. |
| 2003/0135424 A1 | 7/2003 | Davis et al. |
| 2003/0208586 A1 | 11/2003 | Mastronardi et al. |
| 2003/0225834 A1 | 12/2003 | Lee et al. |
| 2004/0014522 A1* | 1/2004 | Walker et al. ............ 463/25 |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0044254 A1 | 2/2005 | Smith |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0125833 A1 | 6/2005 | Nathan et al. |
| 2005/0221654 A1 | 10/2005 | Phillips et al. |
| 2005/0267819 A1 | 12/2005 | Kaplan |
| 2006/0018208 A1 | 1/2006 | Nathan et al. |
| 2006/0035707 A1* | 2/2006 | Nguyen et al. ............ 463/29 |
| 2006/0062094 A1 | 3/2006 | Nathan et al. |
| 2006/0239131 A1 | 10/2006 | Nathan et al. |
| 2006/0247064 A1 | 11/2006 | Nguyen et al. |
| 2006/0293773 A1 | 12/2006 | Nathan et al. |
| 2007/0121430 A1 | 5/2007 | Nathan |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0247979 A1 | 10/2007 | Brillon et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1* | 4/2008 | Kreloff et al. ............ 463/39 |
| 2008/0137849 A1 | 6/2008 | Nathan |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0037969 A1 | 2/2009 | Nathan et al. |
| 2009/0070341 A1 | 3/2009 | Mastronardi et al. |
| 2009/0138111 A1 | 5/2009 | Mastronardi |
| 2009/0265734 A1 | 10/2009 | Dion et al. |
| 2009/0282491 A1 | 11/2009 | Nathan |
| 2009/0298577 A1* | 12/2009 | Gagner et al. ............ 463/25 |
| 2010/0042505 A1 | 2/2010 | Straus |
| 2010/0211818 A1 | 8/2010 | Nathan et al. |

FOREIGN PATENT DOCUMENTS

| | | |
|---|---|---|
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 B1 | 4/1993 |
| EP | 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1408427 | 4/2004 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 06-127885 | 5/1994 |
| JP | 07281682 | 10/1995 |
| JP | 08-037701 | 2/1996 |
| JP | 08-279235 | 10/1996 |
| JP | 8274812 | 10/1996 |
| JP | 10-098344 | 4/1998 |
| JP | 2005-128701 | 5/2005 |
| JP | 3122437 | 6/2006 |
| JP | 2006-260254 | 9/2006 |
| JP | 2006-318313 | 11/2006 |
| JP | 2007-034253 | 2/2007 |
| JP | 2007-506520 | 3/2007 |
| JP | 2007-200239 | 8/2007 |
| TW | 514511 | 12/2002 |
| TW | M274284 | 9/2005 |
| TW | M290206 | 5/2006 |
| WO | WO 86/01326 | 2/1986 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/45835 | 10/1998 |
| WO | WO 01/00290 | 1/2001 |
| WO | WO 01/08148 | 2/2001 |
| WO | WO 02/095752 | 11/2002 |
| WO | WO 2006/014739 | 2/2006 |
| WO | WO 2007/092542 | 8/2007 |

(56) References Cited

FOREIGN PATENT DOCUMENTS

OTHER PUBLICATIONS

JVL, Vortex Brochure, JVL Corporation 2005, 2 pages.
JVL, iTouch 27 New Games Brochure, JVL Corporation 2005, 2 pages.
JVL, Look and iTouch Brochure, JVL Corporation 2004, 2 pages.
Merit Entertainment, Mod Box Internet Jukebox Brochure, M.E. 2006, 2 pages.
JVL, iTouch 8 Plus Brochure, JVL Corporation 2005, 2 pages.
Merit Industries, Inc., Megatouch Champ Brochure, Merit Industries, Inc., 2005, 2 pages.
European Search Report issued for European Application No. 08000845.1-1238/1962251, dated Apr. 3, 2009.
"Darts Revolution Again", Replay Magazine, Mar. 1991, pp. 146-148.
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Bonczek et al, "The DSS Development System", 1983 National Computer Conference, Anaheim, California, May 16-19, 1983, pp. 441-455.
Derfler et al., "How Networks Work", Millennium Ed., Que Corporation, Jan. 2000.
European Search Report from EP 1 993 079.
Gralla, "How the Internet Works", Millennium Ed., Que Corporation, Aug. 1999.
Grimes, Chapter 18, "Taking Advantage of Web-based Audio".
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
Koskelainem, "Report on Streamworks™".
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Melnik et al., "A mediation infrastructure for digital library services", ACM DL, pp. 123-132, 2000.
Newsome et al., "Proxy compilation of dynamically loaded java classes with MoJo", ACM LCTES, pp. 204-212, 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), 27 Oct. 1 JP 07 281682, figure 1-6 abrége.
Schneier, "Applied Cryptography", Second Edition, John Wiley & Sons, Inc. New York, 1996.
Stevens, "TCP/IP Illustrated: vol. 1, the Protocols".
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Chinese Office Action issued in Application No. 2012100977351 dated Dec. 20, 2013.
Office Action issued on Dec. 3, 2013 in corresponding Taiwanese Application No. 097110507 (with translation).

\* cited by examiner

GAME TERMINAL CONFIGURED FOR INTERACTION WITH JUKEBOX DEVICE SYSTEMS INCLUDING SAME, AND/OR ASSOCIATED METHODS

FIELD OF THE INVENTION

This invention relates generally to coin-operated video entertainment systems. More particularly, aspects of the invention provide methods and systems for controlling access to a portable coin-operated interactive entertainment device that may be used to play video games and access other forms of entertainment.

DESCRIPTION OF RELATED ART

Coin-operated video game devices have become common in restaurants and bars. Coin-operated video game devices are large devices or devices that are secured to a table or other stationary object. One or more players may use a coin-operated video game device to play trivia games, card games and other common games. Because of the value of such devices, they are designed to be stationary to prevent theft. Among other disadvantages, stationary coin-operated video game devices tend to be underutilized because users are required to be at the fixed location of the devices, and which may not necessarily be in the best playing location for maximizing earnings. The large devices also limit acceptance due to limited space at the location for such.

Some restaurants and bars have distributed non-coin operated portable communication devices that are configured to allow users to play trivia and card games. Because the devices are portable, risk of theft is a concern. In order to minimize losses due to theft, such devices are designed to be inexpensive and have limited processing and display capabilities. The limited processing and display capabilities result in a less than optimal experience for users.

Therefore, there is a need in the art for portable coin-operated video entertainment systems that provide rich multimedia experiences while controlling access to the portable components.

BRIEF SUMMARY

Aspects of the invention overcome problems and limitations of the prior art by providing portable coin-operated interactive entertainment game systems and methods.

Portable interactive entertainment devices may include touch screens or other input means and allow users to play video games, access other forms of entertainment and access data and/or devices connected to a local area network or a wide area network. In various embodiments portable interactive entertainment devices are removably secured to one or more stands. Each portable interactive entertainment device and/or a central tower may be configured to receive payment. The payment may be in the form of currency credit card, debit card or another form of payment. Portable interactive entertainment devices can become unsecured from stands in response to the receipt of payment, or remote controls operated by the location's employees.

In various embodiments, portable interactive entertainment devices may be configured to allow users to listen to music, gamble, order food, access the internet, play movies, watch TV, send messages and personal ads, participate in tournaments, order merchandise, make phone calls, view advertising, and access and participate in other forms of entertainment.

Some embodiments of the invention may include or utilize computer-executable instructions for performing one or more of the disclosed methods. The computer-executable instructions may be stored on a computer-readable medium, such as a portable memory drive or optical disk.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
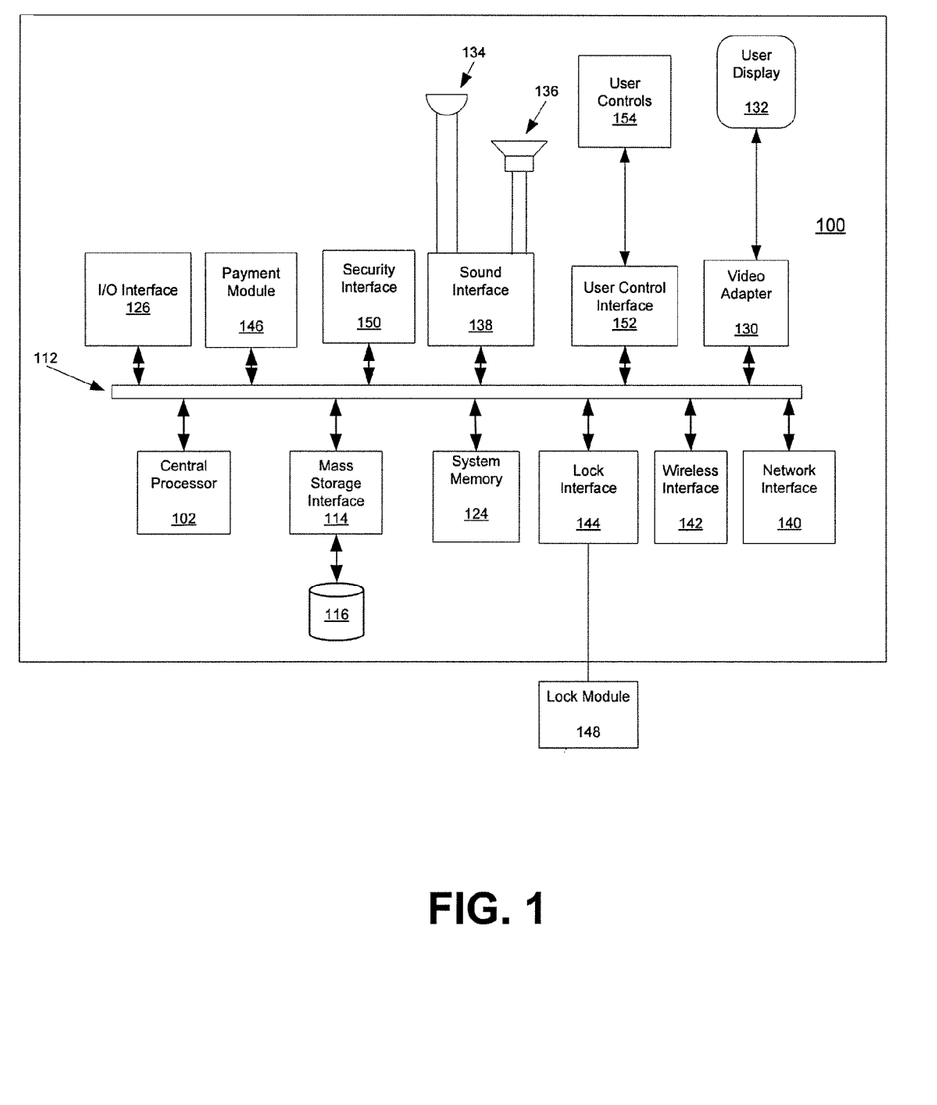
FIG. 1 shows a portable interactive entertainment device and communication connections, in accordance with an embodiment of the invention.

Various embodiments of the present invention may be implemented with computer devices and systems that exchange and process data. Elements of an exemplary portable interactive entertainment device 100 are illustrated in FIG. 1. Portable interactive entertainment device 100 includes a central processor 102 that controls the overall operation of the device and a system inter-connect bus 112 that connects central processor 102 to the components described below. System inter-connect bus 112 may be implemented with any one or more of a variety of conventional bus architectures. In some embodiments, interconnect bus 112 is implemented with several discrete buses.

Portable interactive entertainment device 100 can include a variety of interface units and drives for reading and writing data or files. In particular, portable interactive entertainment device 100 includes a mass storage interface 114 coupling a hard disk drive 116 to system inter-connect bus 112. Hard disks generally include one or more read/write heads that convert bits to magnetic pulses when writing to a computer-readable medium and magnetic pulses to bits when reading data from the computer-readable medium. A single hard disk drive 116 is shown for illustration purposes only and with the understanding that portable interactive entertainment device 100 may include several of such drives. Furthermore, portable interactive entertainment device 100 may include drives for interfacing with other types of computer readable media such as magneto-optical drives.

Unlike hard disks, system memories, such as system memory 124, generally read and write data electronically and do not include read/write heads. System memory 124 may be implemented with a conventional system memory having a read only memory section that stores a basic input/output system (BIOS) and a random access memory (RAM) that stores other data and files.

A user can interact with portable interactive entertainment device 100 with a variety of input devices. FIG. 1 shows an input/output interface 126 that may be coupled to a keyboard, a pointing device or other components. Input/output interface 126 may be implemented with a USB, serial or other type of interface. A user control interface 152 may also be coupled to user controls 154.

Portable interactive entertainment device 100 may include additional interfaces for connecting peripheral devices to system inter-connect bus 112. An IEEE 1394 interface may additionally or alternatively be used to couple additional devices to portable interactive entertainment device 100. Peripheral devices may include touch sensitive screens, game pads, scanners, printers, and other input and output devices and may be coupled to system inter-connect bus 112 through parallel ports, game ports, PCI boards or any other interface used to couple peripheral devices to a computer.

Portable interactive entertainment device 100 also includes a video adapter 130 coupling a display device to system inter-connect bus 112. In the embodiment shown in FIG. 1 a user display device 132 is used. The display device may include a cathode ray tube (CRT), liquid crystal display (LCD), field emission display (FED), plasma display or any other device that produces an image that is viewable by the user. User display 132 may also be implemented with a touch screen display. Sound can be recorded and reproduced with a microphone 134 and a speaker 136. A sound interface 138 may be used to couple microphone 134 and speaker 136 to system inter-connect bus 112.

One skilled in the art will appreciate that the device connections shown in FIG. 1 are for illustration purposes only and that several of the peripheral devices could be coupled to system bus 112 via alternative interfaces.

Portable interactive entertainment device 100 includes a network interface 140 that may be used to couple portable interactive entertainment device 100 to a local area network (LAN) or a wide area network (WAN), such as the Internet. A wireless interface 142 may also be used to connect to LAN or a WAN. Wireless interface 142 may be configured to communicate with a WiFi network, an infrared remote control and/or a radio frequency remote control.

The operation of portable interactive entertainment device 100 can be controlled by computer-executable instructions stored on a computer-readable medium. For example, portable interactive entertainment device 100 may include computer-executable instructions for transmitting information to a server, receiving information from a server and displaying the received information on display device 132.

Figure 2:
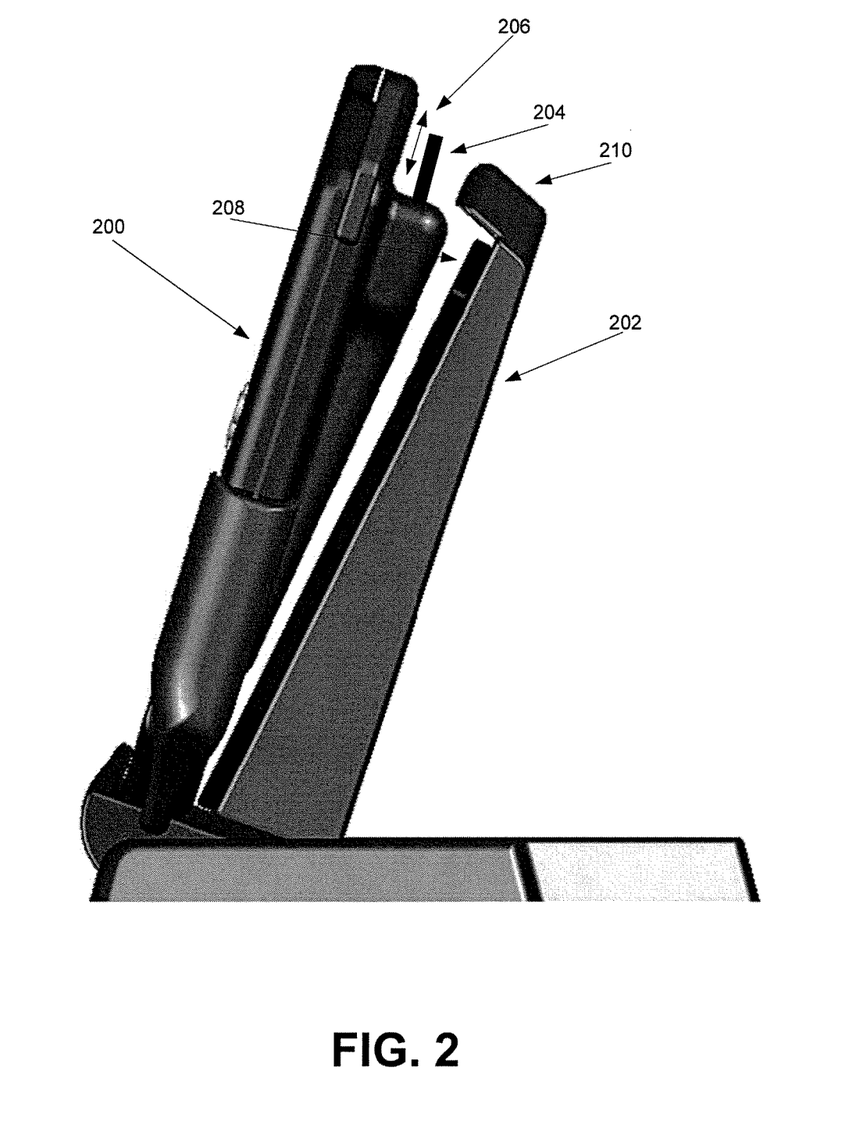
FIG. 2 shows a portable interactive entertainment device removably secured to a stand, in accordance with an embodiment of the invention.

Portable interactive entertainment device 100 may include a locking interface 144. As will be described in detail below, embodiments of the invention include portable interactive entertainment system device that may be removably secured to a stand. FIG. 2, for example, shows a portable interactive entertainment device 200 removably secured to a stand 202. A locking pin 204 is mounted within portable interactive entertainment device 200 such that locking pin 204 may move in the directions shown by arrow 206. When locked, portable interactive entertainment device 202 is in contact with a front surface 208 of stand 202 and locking pin 204 extends into a top surface 210 of stand 202. Portable interactive entertainment device 200 may be unlocked, such as when a payment module 146 receives a credit card payment, by causing locking pin 204 to move away from top surface 210 of stand 202. Payment module 146 may include a credit card reader, currency validator or other mechanism for receiving payment from a customer. Payment module 146 may be configured to transmit a signal to locking module 144 which then causes locking pin 204 to move. Locking interface 144 may also control the position of locking pin 204 in response signals received from wireless interface 142. For example, wireless interface 142 may receive infrared or radio frequency signals that determine whether portable interactive entertainment device 200 is secured to or unsecured from stand 202. In one implementation a remote control may be used to release a portable interactive entertainment device from a stand.

The position of locking pin 204 may be controlled by the combination of a spring and an electromagnet. Such components may be incorporated into a locking module 148 (shown in FIG. 1). One skilled in the art will also appreciate that in alternative embodiments two or more locking pins may be used to secure portable interactive entertainment device 200 to stand 202. Moreover, one or more conventional mechanisms for removably securing a portable device to a stationary object may be also used.

Portable interactive entertainment device 200 and stand 202 may be located in businesses such as bars and restaurants. Portable interactive entertainment device 200 may be configured to allow users, such as customers, to play video games, access menus, send and receive email, access a local area network (LAN), access a wide area network (WAN), pay bills and perform other functions that are typically performed with computer devices.

Portable interactive entertainment device 200 may also include a sensor or tag that is used to determine when a user attempts to remove the device from a premises. For example, portable interactive entertainment device 200 may include a radio frequency identification (RFID) tag that causes a reading system to sound an alarm when a user attempts to transport the device through a doorway. A security interface 150 (shown in FIG. 1) may periodically send and/or signals to and from an external device to confirm that portable interactive entertainment device 200 is within a predetermined area. Portable interactive entertainment device 200 may be configured to shut down when a security violation occurs. In some embodiments, the device may only be restarted when placed in a stand. Portable interactive entertainment device 200 may also be configured to take a picture and transmit the picture to a stand when the device leaves a predetermined area.

Figure 3:
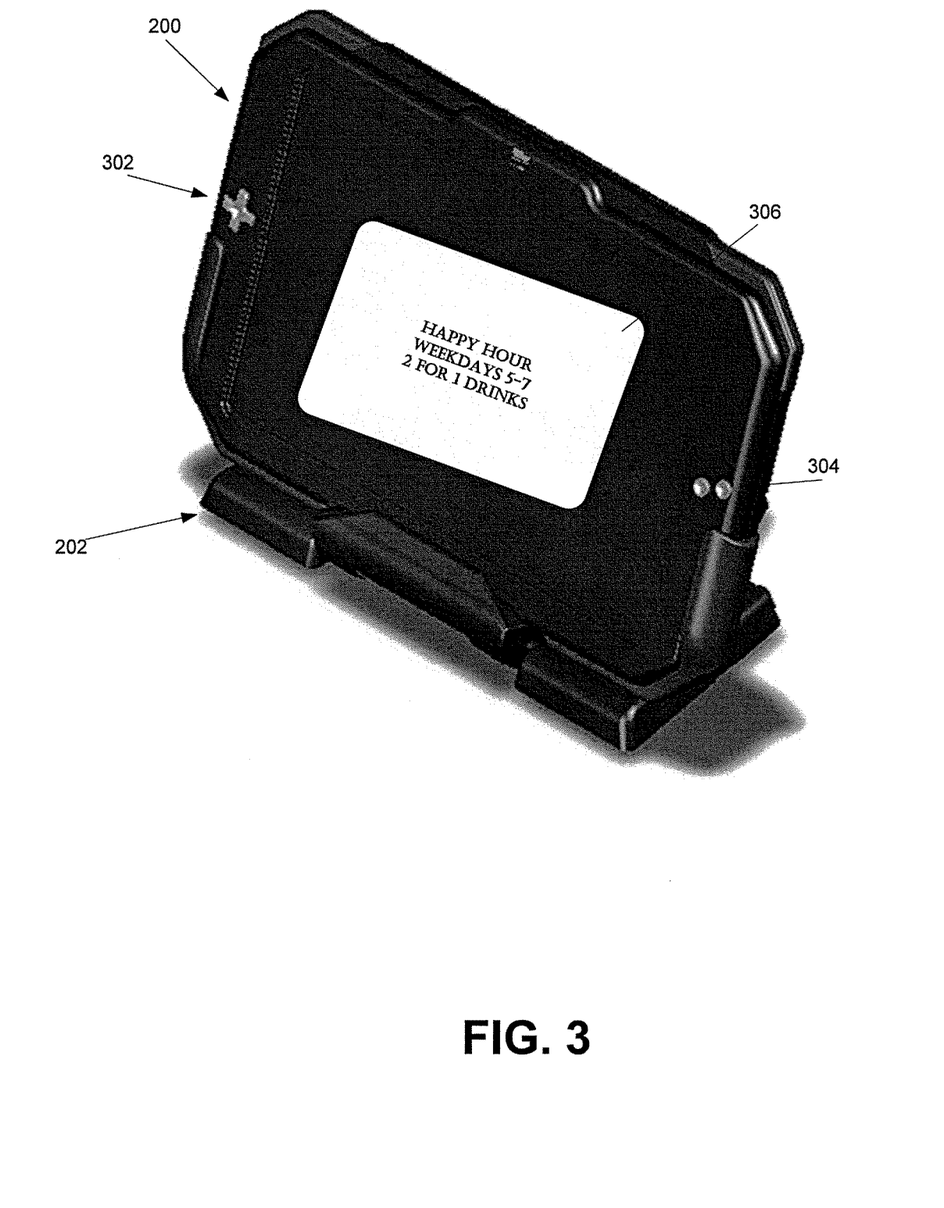
FIG. 3 shows a portable interactive entertainment device secured in a stand, in accordance with an embodiment of the invention.

FIG. 3 shows a view of portable interactive entertainment device 200 when locked in stand 202. Portable interactive entertainment device 200 may include game controls 302 and 304 that may be used when playing video games or interacting with a graphical user interface. When secured to stand 202, portable interactive entertainment device 200 may be configured to display advertisements, such as advertisement 306. Advertisements may be added locally or via a wide area network, such as the Internet. In one embodiment, a group of portable interactive entertainment devices may be connected to a local area network and display coordinated advertisements. Of course other video and/or audio content such as video game demonstrations, movie trailers, etc, may also be displayed.

Figure 4:
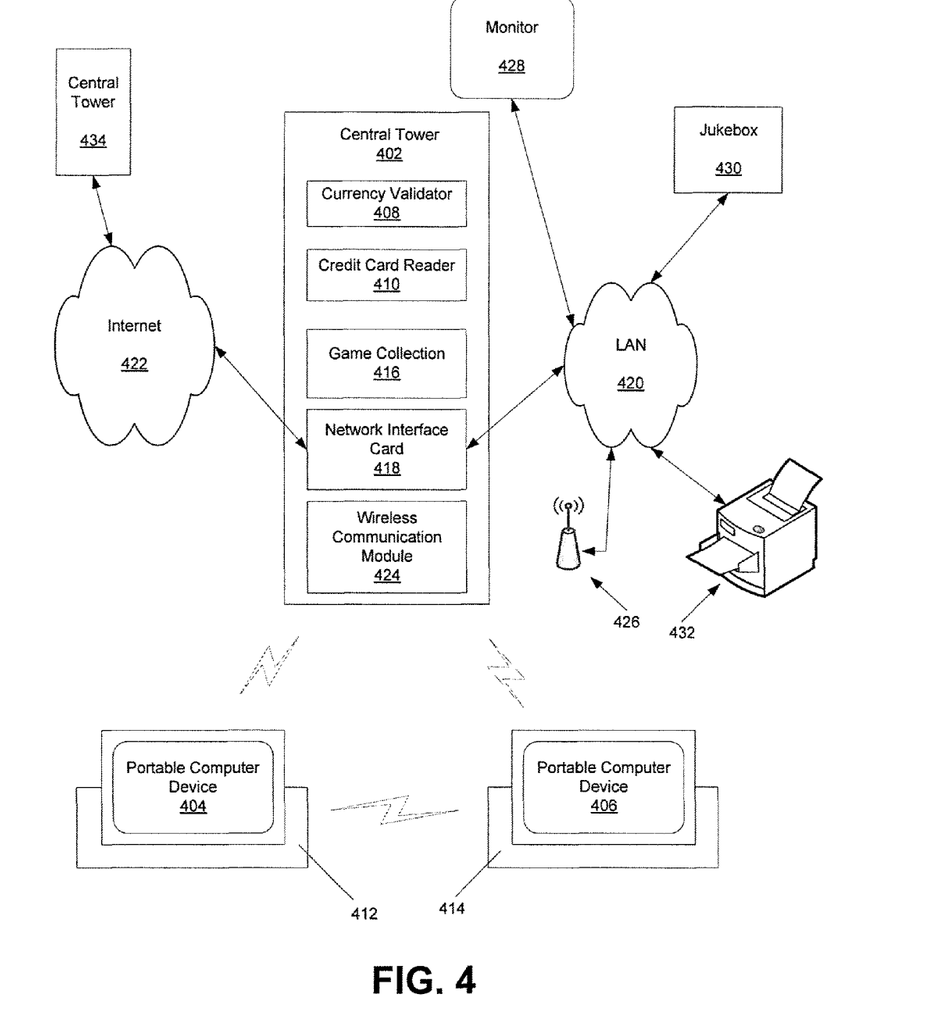
FIG. 4 illustrates a portable coin-operated game system in accordance with an embodiment of the invention.

FIG. 4 illustrates a portable coin-operated game system in accordance with an embodiment of the invention. One skilled in the art will appreciate that "coin-operated" includes devices that operate by paper and coin currency, as well as devices that operate by credit cards, debit cards and other means for paying for the operation of the devices. The system shown in FIG. 4 includes a central tower 402 and two portable interactive entertainment devices 404 and 406. Central tower 402 may be implemented with a computer device that includes a processor, memory and other conventional computer components. Portable interactive entertainment devices 404 and 406 may include touch screens and low power processors.

The system shown in FIG. 4 may include additional portable interactive entertainment devices. Portable interactive entertainment devices 404 and 406 may be similar to portable interactive entertainment device 200 shown in FIG. 2. Each portable interactive entertainment device may be removably secured to a stand, such as stands 412 and 414.

Central tower 402 may include a currency validator 408 that may be used to accept currency from users. Central tower 402 may additionally or alternatively include a credit card reader 410 configured to accept payments from credit cards and/or debit cards. Credit card reader 410 may also be configured to read advertisement data from a plastic card having a magnetic strip. In one embodiment the magnetic strip includes the advertisement data. In another embodiment, the magnetic strip includes a network address, such as an Internet address, or other pointer that identifies the location of the advertisement.

Currency validator 408 and credit card reader 410 may be configured to provide signals that will result in portable interactive entertainment devices 404 and 406 being released from stands 412 and 414. In one embodiment, stands 412 and 414 are integrated into a single structure. Stands 412 and 414 may also be attached to central tower 402.

Central tower 402 may also included a game collection 416 that stores a variety of video games. In one embodiment, games may be retrieved from game collection 416 and transmitted to portable interactive entertainment devices 404 and 406 upon the request of users. The request may include payment from users to play the games. Central tower 402 may also be configured to host games that are played by users of portable interactive entertainment devices 404 and 406. For example, central tower 402 and portable interactive entertainment devices 404 and 406 may be configured in a client server architecture such that central tower 402 processes game data and data is exchanged between central tower 402 and portable interactive entertainment devices 404 and 406.

A network interface card 418 may also be included to allow central tower 402 to connect to a local area network 420 and a wide area network, such as the Internet 422. A wireless communication module 424 may also be included to allow central tower 402 to communicate with local area network 420 and the Internet 422. In one embodiment, one more additional central towers, such as central tower 434 may also be connected to the Internet 422 or another wide area network (WAN) or local area network (LAN). Connecting to additional central towers allows users of portable interactive entertainment devices 404 and 406 to play games, participate in tournaments and communicate with users at other locations, such as other restaurants and bars. In some embodiments, portable interactive entertainment devices may be used to view the identification of others who are logged on or in close proximity. Users may also user portable interactive entertainment devices to exchange video game credits. For example, a first person using a portable interactive entertainment device may send a credit to a second person using another portable interactive entertainment device when the first person loses a video game to the second person.

Portable interactive entertainment devices 404 and 406 may also be configured to communicate in a peer-to-peer environment. For example, portable interactive entertainment devices 404 and 406 may be used to play game, exchange instant messages or exchange other types of data. The communication path between portable interactive entertainment devices 404 and 406 may be wireless or wired. In one embodiment, portable interactive entertainment devices 404 and 406 are configured to communicate with LAN 420 via a wireless access point 426.

The system shown in FIG. 4 may include a variety of additional hardware components that may be utilized by central tower 402 and/or portable interactive entertainment devices 404 and 406. For example, a monitor 428 may be attached to central tower 402. Monitor 428 may display video game data so that users of portable interactive entertainment devices 404 and 406 may view video games on a central monitor that may be placed in a bar, restaurant or other establishment. A jukebox 430 may also be connected to LAN 420. In one embodiment, portable interactive entertainment devices 404 and 406 may be configured to request that particular songs be played by jukebox 430. In some embodiments portable interactive entertainment devices 404 and 406 may accept payment in exchange for assigning priority to a song request.

A printer 432 may also be connected to LAN 420 to facilitate printing of documents. In one implementation, a user may review a bill on portable interactive entertainment device 404 and provide a credit card payment to cause printer 432 to print a credit card receipt that will be signed by a customer. In other embodiments, printer 432 may be utilized to print e-mail messages, Internet content, images captured by a portable interactive entertainment device or any other content that is conventionally processed by printers.

Portable interactive entertainment devices 404 and 406 may communicate with central tower 402 via a wireless or wired connection. Wireless connections facilitate movement of the portable interactive entertainment devices within a premises.

Figure 5:
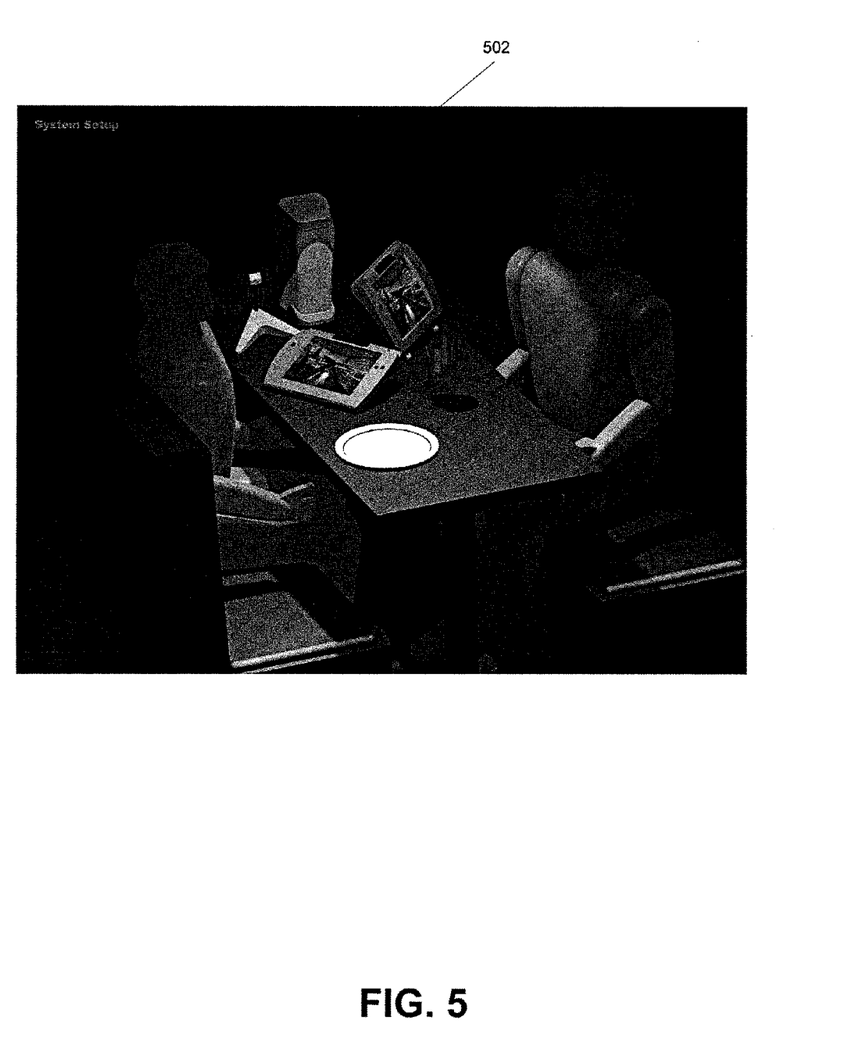
FIG. 5 illustrates another embodiment in which a central tower and two portable interactive entertainment devices are located at a table in a premises, in accordance with an embodiment of the invention.

A premises, such as a restaurant or bar, may also include an ethernet connection at some or all of the tables within the premises which allow for a wired connection between portable interactive entertainment devices 404 and 406 and central tower 402. FIG. 5 illustrates another embodiment in which a central tower 502 and two portable interactive entertainment devices are located at a table in a premises. Other table may also include central towers and portable interactive entertainment devices. The number of portable interactive entertainment devices may correspond to the size of the table.

Figure 6:
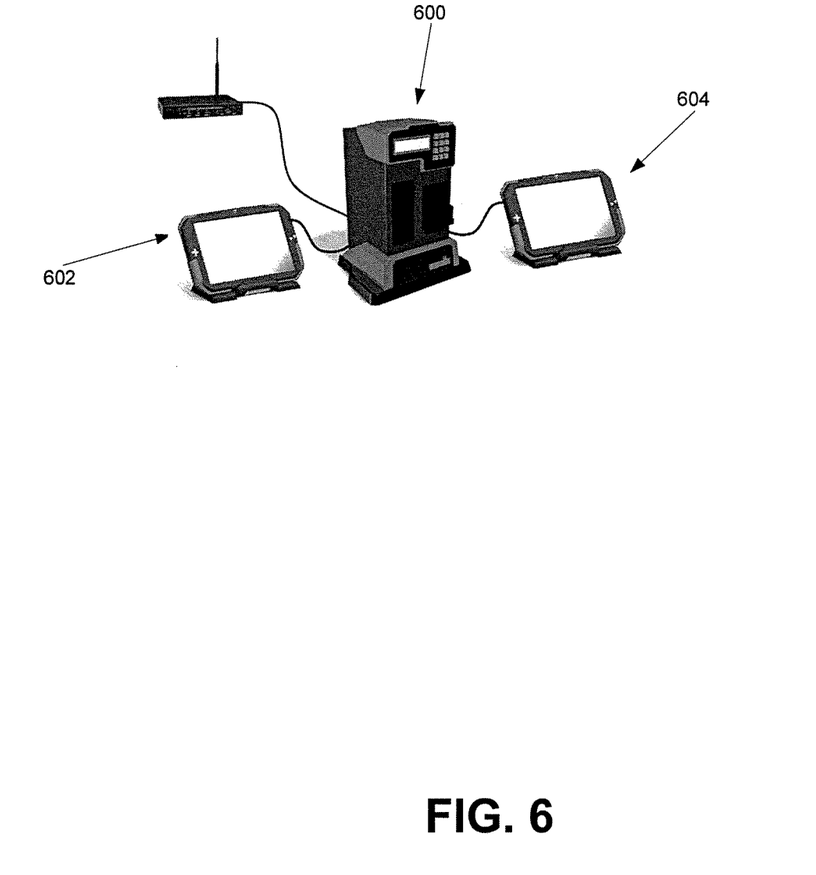
FIG. 6 illustrates an embodiment in which a central tower is configured to receive payment and two portable interactive entertainment devices are attached to tethered stands.
Figure 7:
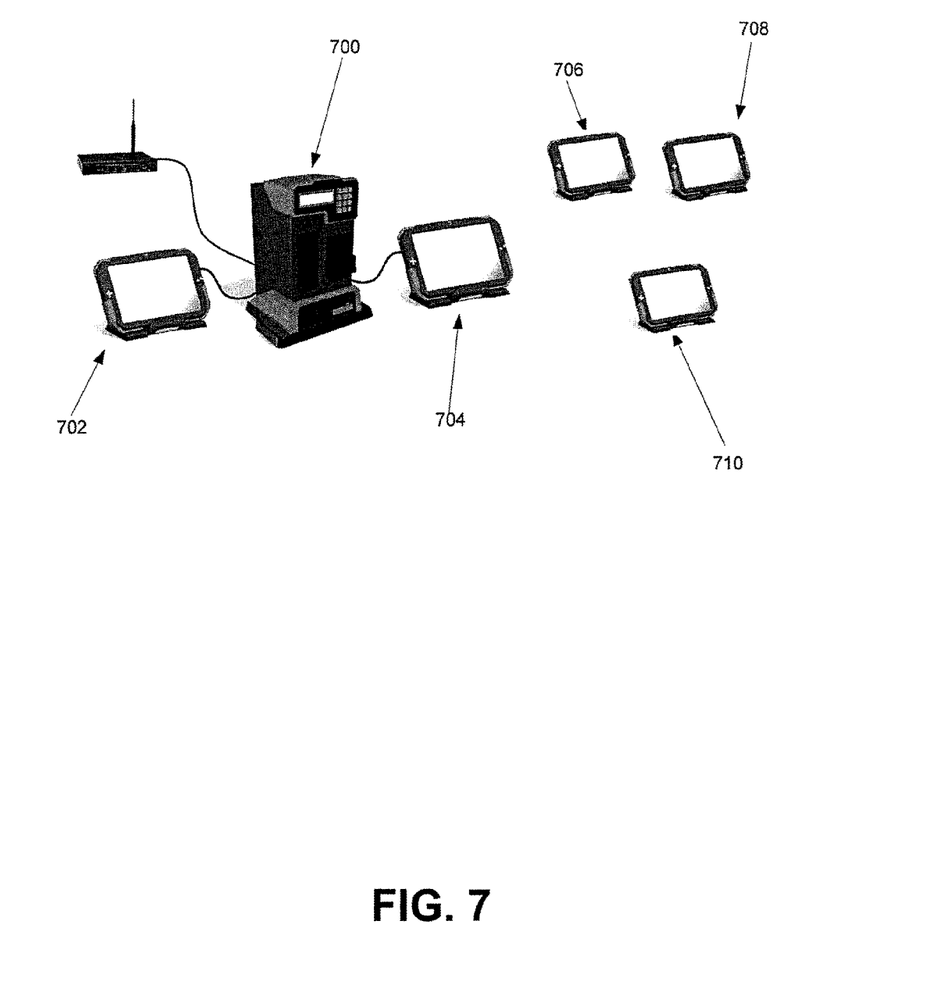
FIG. 7 illustrates an embodiment in which a central tower is configured to receive payment and some portable interactive entertainment devices are attached to tethered stands while other portable interactive entertainment devices are attached to stands that are not tethered.
Figure 8:
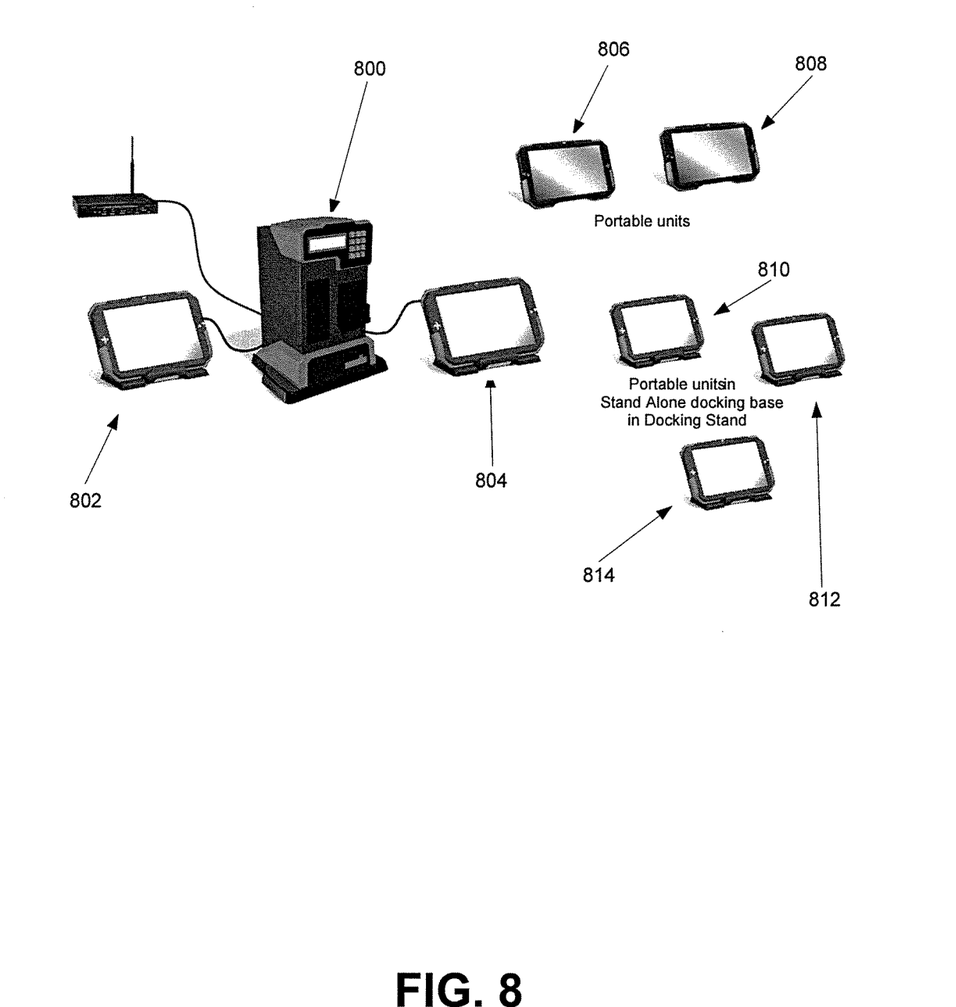
FIG. 8 illustrates an embodiment in which a central tower is configured to receive payment and some portable interactive entertainment devices are attached to tethered stands while other portable interactive entertainment devices are attached to stands that are not tethered and accept payment and some portable interactive entertainment devices which are free standing and not tethered.

Those skilled in art will appreciate that aspects of the invention may be used with a variety of different equipment configurations. FIGS. 6-9 show exemplary configurations that incorporate central towers, tethered stands, stands that are not tethered, external and internal wireless access points and stand alone portable interactive entertainment devices. FIG. 6 illustrates an embodiment in which a central tower 600 is configured to receive payment and two portable interactive entertainment devices 602 and 604 are attached to tethered stands. FIG. 7 illustrates an embodiment in which a central tower 700 is configured to receive payment and some portable interactive entertainment devices 702 and 704 are attached to tethered stands while other portable interactive entertainment devices 706, 708 and 710 are attached to stands that are not tethered. FIG. 8 illustrates an embodiment in which a central tower 800 is configured to receive payment and some portable interactive entertainment devices 802 and 804 are attached to tethered stands while other portable interactive entertainment devices 810, 812 and 814 are attached to stands that are not tethered and other portable interactive entertainment devices 806 and 808 which are free standing and not tethered.

Figure 9:
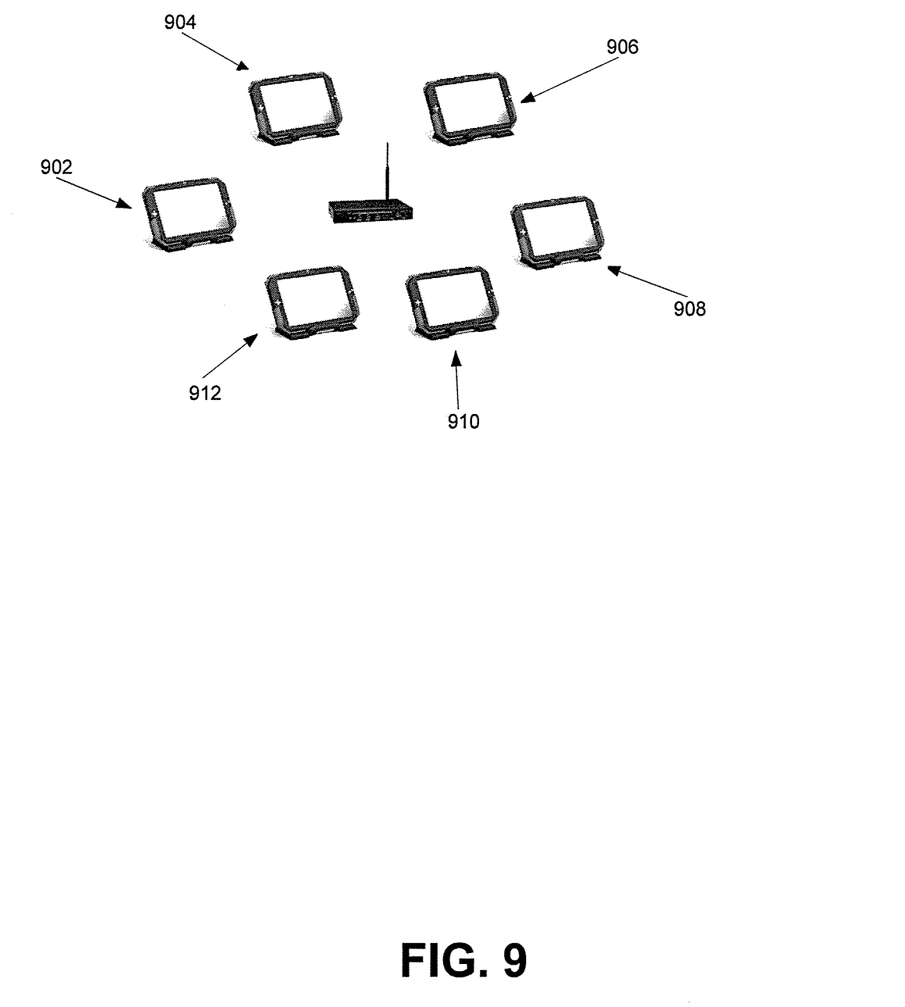
FIG. 9 illustrates an embodiment that includes a group of portable interactive entertainment devices, without a central tower.

Portable interactive entertainment devices 810, 812 and 814 may be configured to accept payment. FIG. 9 illustrates an embodiment that includes a group of portable interactive entertainment devices 902, 904, 906, 908, 910 and 912 without a central tower. Each portable interactive entertainment device may be attached to a stand that includes a battery charging unit and a payment acceptor.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

We claim:

1. A system comprising a plurality of payment-operated portable interactive entertainment devices, each said device comprising:
   a payment module configured to accept payment from a user; and
   a locking module that removably secures the respective portable interactive entertainment device to one of a plurality of stands that are separately distributed within a venue,
   wherein each portable interactive entertainment device is configured to directly communicate with and at least partially control a jukebox located in the venue and remote from the respective portable interactive entertainment device only after the respective portable interactive entertainment device is removed from its stand, the respective portable interactive entertainment device and the jukebox being operable independent of one another at the same and different times, and the jukebox being configured to perform musical selections on a pay-for-play basis within the venue that houses both the portable interactive entertainment devices and the jukebox.

2. The system of claim 1, wherein the payment module of each device comprises a credit card reader and the locking module of each device is configured to release the respective portable interactive entertainment device from its stand in response to a signal from the respective payment module.

3. The system of claim 1, further including a touch screen display.

4. The system of claim 1, further including video game input controls.

5. The system of claim 1, further including a wireless communication module configured to communicate with a WiFi wireless access point.

6. The system of claim 1, further including a wireless communication module configured to receive radio frequency signals.

7. The system of claim 1, further including a wireless communication module configured to send and receive data to and from another payment-operated portable interactive entertainment device.

8. The system of claim 1, further including a computer-readable medium that contains a plurality of video games.

9. The system of claim 1, further including a computer-readable medium that contains a restaurant menu.

10. The system of claim 1, wherein the stand is connected to a central tower, which is a jukebox device that is at least partially controllable to play music stored thereon in response to instructions received from the portable interactive entertainment device once it has been removed therefrom.

11. A payment-operated game system comprising:
    a plurality of portable interactive entertainment devices,
    a plurality of stands to which the plurality of portable interactive entertainment devices are removably secured, respectively; and
    a central tower including an exterior to which the plurality of stands are connected, the central tower being configured to receive payment and selectively cause the portable interactive entertainment devices to be unsecured from their respective stands,
    wherein each said portable interactive entertainment device is configured to directly communicate with and at least partially control one or more jukeboxes located remote from the stands and the portable interactive entertainment devices once removed from a respective stand, the portable interactive entertainment devices and the one or more jukeboxes being operable independent of one another at the same and different times, and each said jukebox being configured to perform musical selections on a pay-for-play basis within a venue housing both the portable interactive entertainment device(s) used to make selections thereon and the respective jukebox, and
    wherein the plurality of stands are separately distributed within the venue.

12. The system of claim 11, further including a cable that secures one of the at least one stands to the central tower.

13. The system of claim 11, further including a display attached to the central tower.

14. The system of claim 13, wherein the central tower is configured to cause the display to display advertisements.

15. The system of claim 13, wherein the central tower is configured to cause the display to display instructions for using the game system.

16. The system of claim 11, wherein the central tower includes a collection of video games.

17. The system of claim 16, wherein the central tower includes a wireless communication module that transmits data to the at least one portable interactive entertainment device.

18. The system of claim 17, wherein the data comprises game data for a game hosted on the central tower.

19. The system of claim 17, wherein the data comprises a video game.

20. The system of claim 11, wherein the central tower includes a credit card reader.

21. The system of claim 11, wherein the at least one stand is attached to the central tower.

22. The system of claim 11, wherein the at least one stand is configured to charge the at least one portable interactive entertainment device.

23. The system of claim 11, wherein credits are sharable among and between portable interactive entertainment devices and the one or more jukeboxes.

24. A non-transitory computer-readable medium containing computer-executable instructions that, when executed, cause a payment-operated game system to at least:
(a) accept a credit card payment from a user;
(b) in response to (a), unsecure one of a plurality of portable interactive entertainment devices from one of a plurality of stands connected to a tower holding the plurality of portable interactive entertainment devices; and
(c) following (b), enable communication between the one of the plurality of portable interactive entertainment devices removed from the respective stand and the tower,
wherein the tower is a jukebox device at least partially controllable to play music stored thereon in response to instructions directly received from the portable interactive entertainment devices once they have been removed therefrom, the portable interactive entertainment devices being operable by the user only in response to (b), the jukebox device being configured to perform musical selections on a pay-for-play basis within a venue housing both the portable interactive entertainment devices and the jukebox device, and
wherein the plurality of stands are separately distributed within a venue.

25. A payment-operated entertainment system comprising:
a jukebox;
a plurality of portable interactive entertainment devices removably secured to a plurality of respective stands; and
a central tower configured to receive payment and activate each said portable interactive entertainment system upon receipt of payment,
wherein each said portable interactive entertainment device is configured to directly communicate with and at least partially control the jukebox once removed from the central tower, the portable interactive entertainment devices and the jukebox being operable independent of one another at the same and different times, and wherein the plurality of stands are separately distributed within a venue, and
wherein credits are sharable among and between portable interactive entertainment devices, as well as between portable interactive entertainment devices and the one or more jukeboxes.

26. The system of claim 25, wherein the portable interactive entertainment device includes a touch screen display.

27. The system of claim 25, wherein the portable interactive entertainment device includes video game input controls.

28. The system of claim 25, wherein the portable interactive entertainment device includes a wireless communication module configured to communicate with a WiFi wireless access point.

29. The system of claim 25, wherein the portable interactive entertainment device includes a wireless communication module configured to receive radio frequency signals.

30. The system of claim 25, wherein each said portable interactive entertainment device is configured to trigger an alarm and shut down in the event that the portable interactive entertainment is being or has been removed from a predefined area.

31. The system of claim 30, wherein each said portable interactive entertainment device is further configured to become re-activated once it is returned to a dock within the predefined area.

* * * * *